(12) United States Patent
Chapotard et al.

(10) Patent No.: US 12,184,065 B2
(45) Date of Patent: Dec. 31, 2024

(54) METHOD AND REGULATING DEVICE FOR REGULATING AN ELECTRICAL POWER TRANSFER

(71) Applicant: Siemens Aktiengesellschaft, Munich (DE)

(72) Inventors: Victor Chapotard, Abbeville (FR); Stefan Niessen, Erlangen (DE); Sebastian Thiem, Neustadt an der Aisch (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 245 days.

(21) Appl. No.: 16/964,908

(22) PCT Filed: Dec. 20, 2018

(86) PCT No.: PCT/EP2018/086305
§ 371 (c)(1),
(2) Date: Jul. 24, 2020

(87) PCT Pub. No.: WO2019/149428
PCT Pub. Date: Aug. 8, 2019

(65) Prior Publication Data
US 2021/0036521 A1    Feb. 4, 2021

(30) Foreign Application Priority Data
Jan. 30, 2018  (EP) .................................. 18154173

(51) Int. Cl.
H02J 3/46    (2006.01)
H02J 3/38    (2006.01)
(Continued)

(52) U.S. Cl.
CPC ........ *H02J 13/00001* (2020.01); *H02J 3/466* (2020.01); *B60L 50/60* (2019.02);
(Continued)

(58) Field of Classification Search
CPC .................................. H02J 3/46; H02J 3/466
(Continued)

(56) References Cited

U.S. PATENT DOCUMENTS

2004/0068670 A1    4/2004  Suzuki et al. ................ 713/300
2006/0072262 A1*   4/2006  Paik .......................... H02J 3/14
                                                           361/62
(Continued)

FOREIGN PATENT DOCUMENTS

CN    102751793 A    10/2012  ............. H02J 50/12
CN    104636821 A     5/2015  ............. G06Q 10/04
(Continued)

OTHER PUBLICATIONS

Search Report for International Application No. PCT/EP2018/086305, 19 pages, Feb. 2, 2019.
(Continued)

*Primary Examiner* — Daniel Kessie
*Assistant Examiner* — Dru M Parries
(74) *Attorney, Agent, or Firm* — Slayden Grubert Beard PLLC

(57) ABSTRACT

Various embodiments include a method for regulating an electrical power transfer between two power supply units and a power consumption unit comprising: providing a first data set with information regarding a minimum and maximum electrical power supply rate for each of the two power
(Continued)

supply units; providing a second data set with information regarding a power requirement of the power consumption unit and a weighting of each of the power supply units; providing a target function for an optimization method, wherein the target function includes the first data set, the second data set, and the weightings of the power supply units as parameters; and regulating the power transfer by means of an extremalization of the target function.

15 Claims, 2 Drawing Sheets

(51) Int. Cl.
*H02J 13/00* (2006.01)
*B60L 50/60* (2019.01)

(52) U.S. Cl.
CPC .......... *H02J 3/381* (2013.01); *H02J 2203/20* (2020.01); *H02J 2300/20* (2020.01); *H02J 2300/24* (2020.01); *H02J 2300/28* (2020.01)

(58) Field of Classification Search
USPC ........................................................ 307/20
See application file for complete search history.

(56) References Cited

U.S. PATENT DOCUMENTS

| | | | |
|---|---|---|---|
| 2012/0249068 A1* | 10/2012 | Ishida | G07F 15/005 320/109 |
| 2013/0226484 A1 | 8/2013 | Rouvala | G06F 19/00 |
| 2014/0274225 A1 | 9/2014 | Lacatus et al. | 455/574 |

FOREIGN PATENT DOCUMENTS

| | | | | |
|---|---|---|---|---|
| CN | 105103628 A | 11/2015 | | H04W 4/02 |
| CN | 107453407 A | 12/2017 | | H02J 3/28 |
| EP | 2 908 400 | 8/2015 | | H02J 3/46 |
| JP | 2017118619 A | 6/2017 | | H02M 3/07 |

OTHER PUBLICATIONS

Kumar Dhivya Sampath et al: "Optimal power scheduling of distributed resources in Smart Grid", 2013 IEEE Innovative Smart Grid Technologies-Asia (ISGT Asia), IEEE, Nov. 10, 2013, pp. 1-6, XP032548052, DOI: 10.1109/ISGT-ASIA.2013.6698777.
Chinese Office Action, Application No. 201880087795.0, 15 pages, Feb. 3, 2023.

* cited by examiner

FIG 2
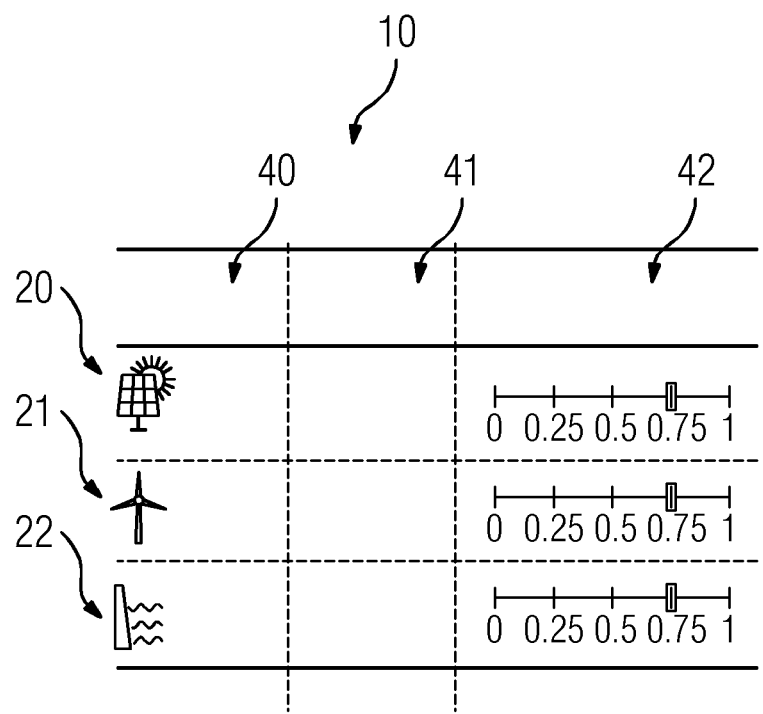
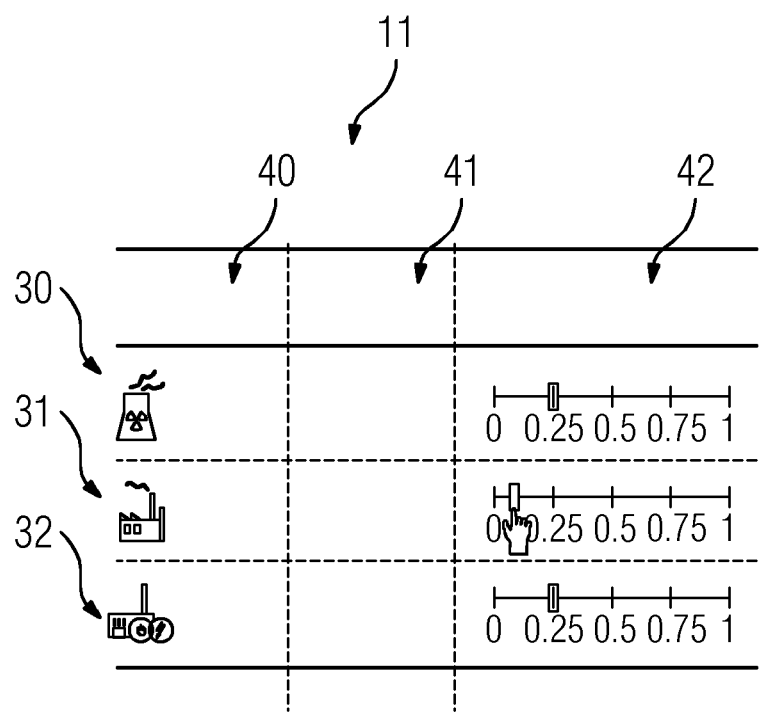

METHOD AND REGULATING DEVICE FOR REGULATING AN ELECTRICAL POWER TRANSFER

CROSS-REFERENCE TO RELATED APPLICATIONS

This application is a U.S. National Stage Application of International Application No. PCT/EP2018/086305 filed Dec. 20, 2018, which designates the United States of America, and claims priority to EP Application No. 18154173.1 filed Jan. 30, 2018, the contents of which are hereby incorporated by reference in their entirety.

TECHNICAL FIELD

The present disclosure relates to electrical power systems. Various embodiments include methods for regulating an electrical power transfer between at least two power supply units and at least one power consumption unit, regulating devices for regulating an electrical power transfer between at least two power supply units and at least one power consumption unit according to the present invention, and/or power supply systems.

BACKGROUND

Distributed power supply units, which, for example, form a power supply system with power consumption units, are being increasingly used. There are new requirements for these power supply systems (electric grid). The power supply units feed into the power supply system, so that their electrical power is supplied for the power consumption unit. In this case, the power supply units are typically geographically widely distributed (decentralized). For example, a large number of the wind power plants in Germany are located in the north. It is therefore necessary to transfer the electrical energy which is generated by means of the wind power plants to the south of Germany via a power supply system. On account of this decentralized arrangement of the power supply units and, where applicable, the power consumption units, it is necessary to have a regulation which regulates, in particular balances, the supply of electrical power as well as the consumption thereof by the power consumption units (load) for each point in time.

The power supply systems can form local energy markets or local power exchanges for this purpose. These also have a connection to a superordinate power supply system, i.e. to a central market. In particular, the price of electrical energy (typically euros per kilowatt hour) differs for the different energy markets or power exchanges.

To operate an energy market or a power exchange, it is necessary to regulate the power transfer between the power supply units and the power consumption units. The regulation ensures that the supply of electrical energy corresponds to the demand for electrical energy, so that the associated power supply system can be operated in a stable manner. In other words, it is necessary that approximately as much energy is supplied as is consumed at any one time. For this purpose, energy markets or power exchanges which are known have a regulating device for regulating the power transfer between the power supply units and the power consumption units. In this case, the power transfer is only regulated based on the supply of and the demand for electrical energy. Furthermore, heuristic methods can be provided for the regulation.

SUMMARY

The teachings of the present disclosure describe an improved method for regulating a power transfer between power supply units and a power consumption unit. For example some embodiments include a method for regulating an electrical power transfer between at least two power supply units and at least one power consumption unit, comprising the steps: providing a first data set with information regarding a minimum and maximum electrical power which can be supplied for each of the power supply units; providing a second data set with information regarding a power requirement of the power consumption unit and a weighting of each of the power supply units; and providing a target function for an optimization method; wherein the target function includes the information from the data sets and the weightings of the power supply units as parameters; and regulating the power transfer by means of an extremalization of the target function.

In some embodiments, meeting the power requirement by way of the power supply units is taken into account as a secondary condition when extremalizing the target function.

In some embodiments, the power supply unit is weighted according to its form of power generation and/or according to its location.

In some embodiments, the power supply unit is weighted according to its operator.

In some embodiments, the second data set is further provided with information regarding separable and/or temporally shiftable electrical power.

In some embodiments, there are at least two power consumption units, in which each of the first data sets is further provided with a weighting of the respective consumption unit, wherein the target function includes the weighting of the consumption units as a parameter.

In some embodiments, the power consumption unit is weighted according to its form of power consumption and/or according to its location.

In some embodiments, the power consumption unit is weighted according to its operator.

In some embodiments, the weightings of the power supply units are provided by a user input.

In some embodiments, an energy storage device, in particular an electrochemical energy storage device, is used as one of the power supply units, wherein the first data set of the energy storage device further includes as information availability of electrical energy stored by means of the energy storage device and/or a minimum capacity of the energy storage device and/or a maximum capacity of the energy storage device and/or a charging efficiency of the energy storage device and/or a loss rate of the energy storage device.

In some embodiments, the energy storage device of an electric vehicle is used, wherein the first data set further includes as information availability of the electric vehicle and/or a minimum energy requirement for operating the electric vehicle.

As another example, some embodiments include a regulating device for regulating an electrical power transfer between at least two power supply units and at least one power consumption unit, wherein the regulating device is designed to carry out a method as described herein.

As another example, some embodiments include a power supply system, comprising at least two power supply units; at least one power consumption unit; and a regulating device as described herein; as well as two first data connections for exchanging the first data sets between the power supply units and the regulating device; a second data connection for exchanging the second data set between the power consumption unit and the regulating device; and a power transfer line between the power supply units and the power consumption unit for electrical power transfer; wherein the electrical power transfer can be regulated by means of the regulating device by a method as described herein.

In some embodiments, each of the power supply units comprises a measuring device for recording at least one piece of information from the first data set of the respective power supply unit and/or the power consumption unit comprises at least one measuring device for recording one piece of information from the second data set.

In some embodiments, the power consumption unit comprises a user interface for inputting the weighting of the power supply units.

BRIEF DESCRIPTION OF THE DRAWINGS

Further advantages, features, and specifications of various embodiments of the teachings herein are set forth in the exemplary embodiments described hereinafter and with the help of the drawings. In the schematic drawings:

FIG. 2 shows a user interface for inputting a weighting of power supply units incorporating teachings of the present disclosure.

DETAILED DESCRIPTION

Figure 1:
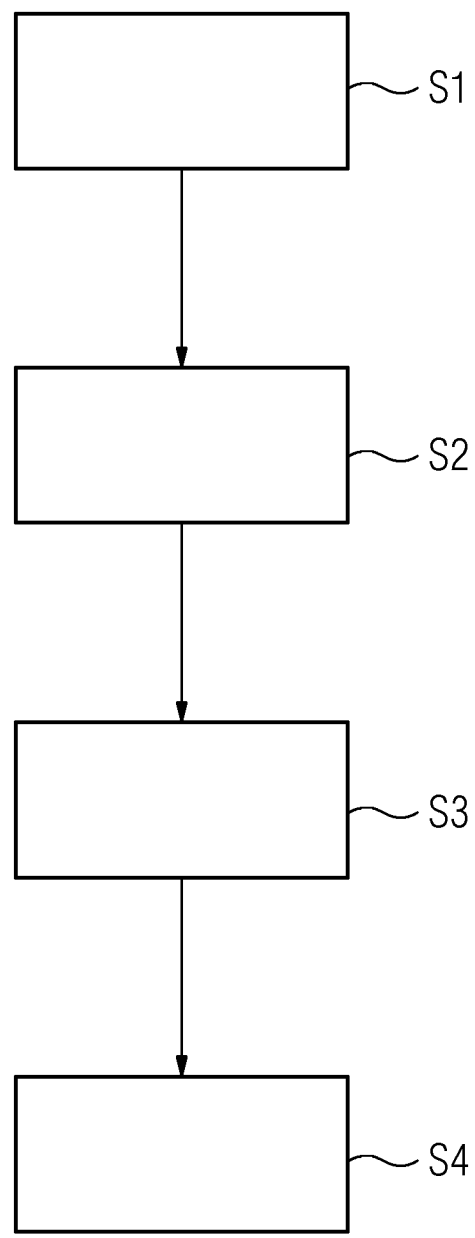
FIG. 1 shows a flow diagram of an example method incorporating teachings of the present disclosure.

In some embodiments, a method for regulating an electrical power transfer between at least two power supply units and at least one power consumption unit comprises at least the following steps:
  providing a first data set with information regarding a minimum and maximum electrical power which can be supplied for each of the power supply units;
  providing a second data set with information regarding a power requirement of the power consumption unit and a weighting of each of the power supply units;
  providing a target function for an optimization method; wherein
  the target function includes the information from the data sets and the weightings of the power supply units as parameters; and
  regulating the power transfer by means of an extremalization of the target function.

Regulating the power transfer can include regulating the distribution of the power generated or supplied by the power supply units on the power consumption unit. In some embodiments, each of the power supply units is designed to supply electrical energy. In other words, a power supply unit is a unit or a device which is designed to supply power or rather electrical energy. In some embodiments, the electrical energy is supplied by means of power generation and/or by means of stored electrical energy, and/or by means of stored energy which is converted into electrical energy. The power consumption unit is designed to consume electrical energy or electrical power.

In some embodiments, the power transfer between power supply units and the at least one power consumption unit is optimized by means of the optimization method with respect to the target function. For this purpose, the target function includes information relating to the power supply units and the power consumption unit, in particular a weighting of the power supply units, as parameters. The information is represented by the first and second data set, wherein the first data sets are provided by the power supply units and the second data set is provided by the power consumption unit.

In some embodiments, the method provides the weighting of the power supply units. In other words, the power consumption unit provides a weighting for the power supply units, wherein this weighting is directly factored into the target function of the optimization method. The weighting is therefore not a secondary condition of the optimization method, but rather parametrizes the target function at least partially. The weighting typically remains constant as a parameter of the optimization method during optimization. The result of the optimization method is a power transfer between the power supply units and the power consumption unit which is optimal or as optimal as possible. In other words, after optimization, it is clear what power the power consumption unit obtains from one of the power supply units. The variables of the target function, which are optimized as best as possible by way of the optimization method, are at least the power generated or supplied by the power supply units contributing to the power transfer. Furthermore, the target function can include prices, for example a minimum and/or maximum price for the power supplied, or a carbon dioxide emission (carbon footprint) of the power supply unit.

In some embodiments, the target function is extremalized, i.e. minimized or maximized, by means of the optimization method, in particular by means of a numerical optimization method. In this case, it is not necessary for the target function to have a precise minimum or maximum, but rather it is sufficient to find a best possible value, for example below a predetermined threshold value.

By weighting the power supply units as taught herein and taking them into account in the optimization method, it is advantageously possible to differentiate the power supply units and to weight them differently. For example, weighting is carried out by an operator of the power consumption unit. If, for example, a stronger weighting is given to one of the power supply units than to the other, the power requirement of the power consumption unit is thus preferably met by the power supply units which are given a stronger weighting. In other words, more electrical energy is obtained from the power supply unit which is given a stronger weighting, as far as possible.

In some embodiments, the weighting is factored into the target function as a parameter. This ensures that the power requirement of the power consumption unit is met. The weighting is thus not taken into account in the form of a secondary condition in the optimization method. In other words, there is no requirement for ten percent of the power requirement to be met by one of the power supply units, for example. In some embodiments, preference may be given to one of the power supply units by means of the weighting as long as the power requirement is met by the power supply units collectively. This ensures that a solution to the optimization method, i.e. the power transfer, is found.

In some embodiments, the method differentiates the power supply units, so that it is possible to indicate the electrical energy supplied or generated with respect to the power supply units. The weighting thus characterizes the power supply units. Various embodiments combine the characterization of the power supply units in a synergetic manner with the condition that the power requirement of the power consumption unit is met.

In some embodiments, the method is used for regulating the electrical power transfer within an energy market or a power exchange, in particular within a local energy market or a local power exchange. This is the case because the likelihood of a power transfer (or current transfer) is increased by weighting. In other words, the likelihood of a transaction is increased.

In some embodiments, meeting the power requirement by way of the power supply units is taken into account as a secondary condition when extremalizing the target function. As a result, the conditions that the power requirement is met is taken into account in the optimization method, so that the power requirement is always met. Only by taking into account the weighting according to the invention within the target function does it become physically possible to establish a secondary condition of this type. In other words, by not taking into account the weighting according to the invention as a secondary condition, it would not always be ensured that the secondary condition of meeting the power requirement can be achieved.

In some embodiments, the power supply unit is weighted according to its form of power generation and/or according to its location. This allows an operator of the power consumption unit to determine which form of power generation and/or which location they prefer. As a result, the likelihood of a power transfer is further increased, since the requirements or preferences of the operator of the power consumption unit can be taken into account. With respect to the form of power generation, a distinction is made between renewable forms of power generation and non-renewable forms power generation, for example. In this case, power supply units which have a renewable form of power generation can be described as renewable power supply units.

Renewable power supply units include solar power plants, wind power plants or hydroelectric power plants, for example. Non-renewable power supply units include gas power plants, coal-fired power plants, nuclear power plants or combined heat and power plants, for example. In other words, it is possible for the operator of the power consumption unit to preferably obtain solar power, wind power, and/or power from hydroelectric power plants, for example. Figuratively, by weighting the electrical energy which is supplied, in particular generated, by the power supply units, a further characteristic can be associated with the electrical energy which indicates it.

In some embodiments, weighting can be carried out by means of or according to the location of the power supply unit. In this case, a distinction can be made between a geographical location of the power supply units and a functional location of the power supply units. A functional location of the power supply units is intended to be understood to mean its participation in a specific energy market and/or a specific power exchange and/or its connection to a specific power supply system, for example. This increases the likelihood of a power transfer, in particular if the power consumption unit has a private operator.

In some embodiments, specific forms of power generation or locations can be promoted by means of evaluating the weightings of the power supply units and/or the locations. If, for example, a stronger weighting is given to renewable forms of power generation, and if the electrical energy generated or supplied by said forms of power generation collectively only meets part of the power requirement, this may promote the development of renewable power supply units. In other words, the present invention may lead to the promotion of renewable energies.

In some embodiments, the power supply unit is weighted according to its operator. As a result, the operator of the power consumption unit can give preference to or not favor the operator of one of the power supply units, i.e. give them a stronger or weaker weighting. In other words, the weighting of the operator of the power consumption unit develops a positive list (whitelist) or a negative list (blacklist). This positive list or negative list is taken into account in the target function as a parameter by means of the weighting. As a result, preferences of the operator of the power consumption unit with respect to the operator of the power supply units can be taken into account.

This, in turn, increases the likelihood of a power transfer, taking into account the preferences. If an operator of one of the power supply units is given a stronger weighting, i.e. the operator is included in the positive list, the operator of the power consumption unit can promote or give preference to (peer-to-peer) an operator of one of the power supply units in their area, for example one of their neighbors who operates a photovoltaic plant as a power supply unit, for example. In particular, the stronger weighting can be carried out via the operator and via the geographical and/or functional location, so that it is possible for an operator of one of the power supply units to be given a repeatedly stronger weighting and thus for preference to be given repeatedly to said operator of one of the power supply units.

The weighting which is provided by the operator of the power consumption unit can characterize their personal preferences. Nevertheless, the technical object is achieved of increasing the likelihood of a power transfer, taking into account the preferences. This is therefore the case, since the operator of the power consumption unit can in fact weight an operator of one of the power supply units or a power supply unit with the value of zero, however by taking into account the weighting within the target function it is ensured that the power requirement is met.

In other words, the operator of the power consumption unit, who has rated an operator of one of the power supply units or one of the power supply units with the value of zero, also obtains electrical power from said operator or said power supply unit if the power requirement cannot be fully met by the further power supply units. In an extreme case, the power requirement is even fully met by the operator of the power supply unit who has been weighted with the value of zero or the power supply unit which has been weighted with the value of zero. In other words, meeting the power requirement takes precedence, so that the power transfer is ensured and the likelihood of the power transfer is increased accordingly.

In some embodiments, the preference of the operator of the power consumption unit, i.e. the aforementioned positive list and/or the aforementioned negative list, can be taken into account as a secondary condition in the optimization method. These thereby represent a stringent condition which must always be met. As a result, the operator of the power consumption unit can completely rule out one of the operators of the power supply units with regard to the power transfer.

In some embodiments, the second data set is further provided with information regarding separable and/or temporally shiftable electrical power. This includes whether the power consumption unit has separable and/or temporally shiftable electrical loads.

In some embodiments, the second data set can include as information a maximum period of time for which the load can be temporally shifted. This makes it possible to improve the stability of a power supply system, with which power supply system the power supply units and the power consumption unit are connected. Furthermore, the operating costs of the power consumption unit can be reduced. One example for a shiftable load is a heating load of a heat pump. One example for a separable load is Christmas tree lights.

In some embodiments, at least two power consumption units are used, wherein each of the first data sets is further provided with a weighting of the respective power consumption unit, wherein the target function includes the weighting of the power consumption units as a parameter. The operators of the power supply units are able to weight the power consumption units. This makes it possible to take into account preferences of the operators of the power supply units with respect to the power consumption units. This further increases the likelihood of a power transfer.

In some embodiments, the power consumption unit is weighted according to its form of power consumption and/or according to its location. It is possible, in turn, to differentiate the geographical and the functional location, according to the weighting of the location of the power supply units. In other words, the geographical and the functional location can be weighted. As a result, an operator of a photovoltaic plant can give a stronger weighting to a power consumption unit of their neighbor, and thus give preference to it. In this case, it may be preferable if the power consumption unit is weighted according to its operator.

There may be similar and equivalent advantages for weighting the power supply units according to their operator. In some embodiments, the weighting of the power supply units is provided by user input. This makes it possible for an operator of the power consumption units to directly input the weightings of the power supply units. In this case, the user input can be carried out by means of a computing device with a graphical user surface (Graphical User Interface; abbreviated GUI), for example via a network, in particular via the internet. It may be advantageous to connect the user input to a computer cloud or data cloud (the cloud), in particular to MindSphere. The information from the second data set can form a profile of the power consumption unit. In some embodiments, the information from the first data sets can in each case form a profile of one of the power supply units.

In some embodiments, the user input can be carried out by means of a regulating unit or control unit of the power supply unit, and/or by means of a regulating unit and/or control unit of the power consumption unit. The regulating unit or control unit of the power supply unit, and/or the regulating unit or control unit of the power consumption unit can have a user interface for this purpose.

In some embodiments, an energy storage device, in particular an electrochemical energy storage device, for example a battery, is used as one of the power supply units, wherein the first data set of the energy storage device further includes as information availability of electrical energy stored by means of the energy storage device and/or a minimum capacity of the energy storage device and/or a maximum capacity of the energy storage device and/or a charging efficiency of the energy storage device and/or a loss rate of the energy storage device.

In other words, the availability of an amount of energy stored by means of the energy storage device and/or the minimum and/or maximum capacity of the energy storage device and/or the charging efficiency of the energy storage device and/or the loss rate of the energy storage device are further taken into account as parameters in the target function. By using the energy storage device, the generation of electrical energy by way of one of the power supply units may be temporally decoupled from its supply and its consumption by the power consumption unit. As a result, the flexibility of the regulation of the power transfer between the power supply units and the power consumption unit or the power consumption units may be improved. This may be particularly advantageous for renewable forms of power generation of the power supply units. For example, the electrical energy of a photovoltaic plant is generated during the day. By means of the energy storage device, it may be possible for a power transfer to also be carried out during the night from the photovoltaic plant to the power consumption unit (via the energy storage device). The power transfer can thus be carried out indirectly.

The information included by the data sets, which indicate the energy storage device, i.e. the minimum and/or maximum capacity of the energy storage device and/or the charging efficiency of the energy storage device and/or the loss rate of the energy storage device, can therefore be recorded by means of measurements or be calculated by means of a mathematical model of the energy storage device. Providing a minimum capacity ensures that the energy storage device is not completely discharged. This may reduce deterioration of the energy storage device. Furthermore, the amount of energy which is retained which corresponds to the minimum capacity could even be used by an operator of the energy storage device.

In some embodiments, when electrical energy is stored by means of the energy storage device, its identification, i.e. its weighting or its weightings, for example according to its power supply unit, its form of power generation and/or according to the location of its power supply unit, is maintained. An operator of an energy storage device can provide a price for storage. In this case, it can be assumed that the operator of the power consumption unit, who has given a stronger weighting to solar power, for example, bears the additional costs which are associated with storage.

In some embodiments, the energy storage device of an electric vehicle, in particular an electric land vehicle (electric car), an electric water vehicle or an electric aircraft (electric airplane) is used, wherein the first data set further includes as information availability of the electric vehicle and/or a minimum energy requirement for operating the electric vehicle. In other words, the availability of the electric vehicle and/or its minimum energy requirement for operating are used as parameters for the target function and are taken into account accordingly. In this case, the aforementioned information can be provided by means of a model of the electric vehicle. The minimum energy requirement is identified by a travel distance, for example. The distance or travel distance can be established by means of connecting the vehicle to a calendar of the operator, for example Outlook, Apple Calendar and/or Google. From the data of the calendar, the energy which is required for the distance can be retained by determining the minimum capacity in the energy storage device.

A regulating device incorporating teachings of the present disclosure for regulating an electrical power transfer between at least two power supply units and at least one power consumption unit is characterized in that it is designed to carry out a method incorporating the teachings herein and/or one of its configurations. An energy market or a power exchange comprises at least one regulating device incorporating the teachings herein. The energy market or the power exchange is therefore also designed to carry out a method as taught herein and/or one of its configurations.

A power supply system incorporating the teachings herein comprises:
    at least two power supply units;
    at least one power consumption unit; and
    a regulating device as taught herein; as well as
    two first data connections for exchanging the first data sets between the power supply units and the regulating device;
    a second data connection for exchanging the second data set between the power consumption unit and the regulating device; and
    a power transfer line between the power supply units and the power consumption unit for electrical power transfer; wherein
    the electrical power transfer can be regulated by means of the regulating device by a method as taught herein and/or one of its configurations.

The power supply systems taught herein may provide an energy market which regulates, in particular distributes, the power transfers between the power supply units and the power consumption units. As a result, the power supply system can take into account preferences of the power supply units and the power consumption units or rather their operators, without reducing the likelihood of a power transfer. Said preferences may be taken into account by the weightings, wherein the weightings are incorporated into the optimization method as a parameter of the target function. As a result, the preferences are taken into account as optimally as possible.

In some embodiments, prices or price expectations are also taken into account as a parameter in the target function. The actual price for an energy supplied can be identified by means of the optimization method, i.e. this is another variable of the target function. The variables of the target function can be identified again from time to time, i.e. according to time steps. As a result, the actual price (transaction price)—comparable to a stock exchange—can be dynamically identified.

The second data set can include as information a maximum price expected by the operator of the power consumption unit. Furthermore, the first data set can include as information a minimum price expected by the operator of one of the power supply units. Furthermore, the first data set can also include as information prices or price expectations for an energy storage device with respect to storing electrical energy. If the method is regularly carried out at different points in time, the energy storage device couples two successive points in time or time steps. This results in the losses of the energy storage system having to be taken into account in the price expectations, for example. They can also be factored into the target function as a parameter. For example, the operator of the energy storage device provides a minimum price (euros per kilowatt hour or euros per kilowatt hour per storage period). The transaction price for storage which is established by means of the optimization method is determined at the point in time at which the electrical energy is transferred to the power consumption unit (power transfer).

In some embodiments, each of the power supply units comprises a measuring device for recording at least one piece of information from the first data set of the respective power supply units and/or the power consumption unit comprises at least one measuring device for recording one piece of information from the second data set.

In other words, the power supply units and/or the power consumption units have measuring apparatuses or sensors which are designed to record the respective information. This makes it possible to establish a current state of all power supply units and power consumption units. In some embodiments, as much information as possible is provided for the power supply units and/or the power consumption units. For example, the life expectancy, efficiency and/or maintenance intervals can be provided as information for a photovoltaic plant and can also be taken into account as parameters of the target function in the optimization method.

In some embodiments, the measuring apparatus can be designed as a smart meter. If a power consumption unit does not have a smart meter, a distinction can thus be made between industrial and private power consumption units. The power requirement can typically be provided for an industrial power consumption unit. For a building which comprises the private power consumption unit, the power requirement can be established, in particular predicted, according to the size of the building, the number of occupants of the building and/or via the status of the occupants, i.e. wage earners, children or pensioners, by means of the computing device according to the invention.

Owing to the measuring apparatuses, operation of the power supply system is advantageously almost fully automated, such that intervention by the respective operator is typically not required. The required technical parameters which are factored into the target function are recorded in an automated manner by the measuring apparatuses and provided as information via the data sets. However, adjusting or changing the weighting is possible and envisaged.

In some embodiments, the power consumption unit comprises a user interface in order to input the weighting of the power supply units. This allows an operator of the power consumption unit to provide the weighting of the power supply units. The weighting can also be adjusted or changed via the user interface.

Elements which are identical, equivalent or have an identical effect can have the same reference numbers in one of the figures or in the figures. In a first step S1 of an example method incorporating teachings of the present disclosure, a first data set is provided with information regarding a minimum and maximum electrical power which can be supplied for each of the power supply units. In other words, the regulation therefore knows the minimum and maximum electrical power which is supplied by each of the power supply units, so that this can be taken into account by the regulation.

In a second step S2 of the example method, a second data set is provided with information regarding a power requirement of the power consumption unit and a weighting of each of the power supply units. In other words, the regulation therefore knows the power requirement which the power consumption unit has and how the power supply units are weighted. In particular, the information or rather the data sets provided determine the supply of electrical energy and the demand for electrical energy.

Furthermore, the weighting of the power supply units is provided. This makes it possible for an operator of the power consumption unit to weight the power supply units differently. In other words, a preference of the operator with respect to the power consumption unit can be taken into account, for example their preference with respect to a form of power generation of the power supply unit and/or with respect to its location (geographical or functional) and/or with respect to an operator of the power supply unit. In particular, the weighting according to the invention thus has the technical effect of taking preferences into account, without it reducing the likelihood of the power transfer.

Furthermore, the example method increases the likelihood of the power transfer when preferences are taken into account (as weighting).

In a third step S3 of the example method, a target function for an optimization method is provided. In this case, it is envisaged according to the invention that the information from the data sets and in particular the weighting of the power supply units are taken into account as parameters in the target function. In other words, the target function is provided or formed depending on the weightings and the information from the data sets. The information from the data sets as well as the weighting or weightings in this case represent parameters of the target function, i.e. they are considered constant when minimizing the target function by means of the optimization method. The variables of the target function are the electrical power supplied by the power supply units, for example.

If the power supply units or the power supply system are connected to a further external power supply system, the electrical power which is supplied and discharged by these power supply systems can also be a variable of the target function. In other words, the power supply system can be coupled to further power supply systems, in particular to superordinate power supply systems, for a power exchange (power transfer).

In a fourth step S4 of the example method, the power transfer is regulated by means of an extremalization of the target function. In this case, the best possible values of the power of the power supply units are established, for example. This may result in a power transfer from the power supply units to the power consumption unit which is as optimal as possible, taking into account the preferences, i.e. the weighting of the power supply units. In this case, the significance of regulating the power transfer includes regulating the distribution of the power which is generated or supplied. In particular, a direct power transfer from the power supply units to the power consumption units is not required. An indirect power transfer via an energy storage device and/or via an external power supply system and/or further elements may be envisaged.

The weighting can be provided by means of a user interface, i.e. via a user input. FIG. 2 represents an exemplary user interface. By way of example, a target function Z is represented mathematically hereinafter with a plurality of weightings. Hereinafter, the operator of a power supply unit is described as a generator and the operator of a power consumption unit as a consumer. The target function Z can include a number of sub-target functions $Z_n$.

A first sub-target function $Z_1$ for the consumer is provided or determined, for example, by means of $$Z_1 = \sum_t \sum_{i,j,k} w_{ij}^E \cdot w_{jk}^A \cdot P_{ijk;t} \cdot (x_j^{MAX} - x_{k;t})$$

wherein $w_{ij}^E$ refers to the weighting of the generator i by the consumer j, $w_{jk}^A$ to the weighting of the form of power generation k by the consumer j, $P_{ijk;t}$ to the power transfer from the generator i to the consumer j by means of the form of power generation k at the point in time t, $x_j^{MAX}$ to a maximum price expected by the consumer j and $x_{k;t}$ to the transaction price (actual or negotiated price) of the form of power generation k at the point in time t. In this case, the target function is a linear combination of individual power $P_{ijk;t}$ or power transfers. In other words, $P_{ijk;t}$ indicates the power transfer from the power supply unit i with the form of power generation k to the power consumption unit j at the point in time t or at the time step t.

A second sub-target function $Z_2$ for the generator is, for example, provided or determined by means of $$Z_2 = \sum_t \sum_{i,j,k} w_{ij}^V \cdot P_{ijk;t} \cdot (x_{k;t} - x_{i,k}^{MIN})$$

wherein $w_{ij}^V$ refers to the weighting of the consumer j by the generator i, and $x_{i,k}^{MIN}$ to a minimum price expected by the generator i for their form of power generation k.

A third sub-target function $Z_3$ for the consumer, taking into account energy storage devices, is, for example, provided or determined by means of $$Z_3 = \sum_t \sum_{i,j,k,l} w_{ij}^E \cdot w_{jk}^A \cdot P_{ijkl;t}^{ESOUT} \cdot (x_j^{max} - x_{k;t} - x_{i,j,k,l;t}^{ES} \cdot \Delta t)$$

wherein $x_{i,j,k,l;t}^{ES}$ refers to the additional price which is to be paid by the consumer j on account of storage in the energy storage device l at the point in time t+1, $\Delta t$ to the time step, and $P_{ijkl;t}^{ESOUT}$ to the electrical power (power transfer) which the consumer j obtains from the energy storage device l of the generator i and according to the form of generation k.

A fourth sub-target function $Z_4$ for the generator, taking into account energy storage devices, is, for example, provided or determined by means of $$Z_4 = \sum_t \sum_{i,j,k,l} w_{ij}^V \cdot P_{ijkl;t}^{ESIN} \cdot (x_{k;t} - x_{i,k}^{MIN})$$

wherein $P_{ijkl;t}^{ESIN}$ refers to the electrical power which is charged into the energy storage device l by the generator i with the form of power generation k and which is intended for the consumer j.

A fifth sub-target function $Z_5$ for the operator of the energy storage device is provided or determined by means of $$Z_5 = \sum_t \sum_{i,j,k,l} (P_{ijkl;t}^{ESOUT} - P_{ijkl;t}^{ESIN}) \cdot x_{k;t}$$

A sixth sub-target function $Z_6$ of the consumer for separable power is, for example, provided or determined by means of $$Z_6 = \sum_t \sum_{j,d} (1 - p_{j,d}) \cdot x_{j,d}^D \cdot P_{j,d,t}^D$$

wherein $P_{j,d}$ is a binary parameter which has the value of zero if a separable power requirement (or a separable power profile) d of the consumer j is separated, $x_{j,d}^D$ refers to a cost benefit for the consumer j for separating the power requirement d, and $P_{j,d,t}^D$ to the separable power d of the consumer j.

A seventh sub-target function $Z_7$ for an electric vehicle 1 is, for example, provided or determined by means of $$Z_7 = \sum_l \sum_t \sum_{i,k} w^E_{ij_l} \cdot w^A_{j_l k} \cdot P^{EV}_{ikl;t} \cdot \left(x^{MAX}_{j_l} - x_{k;t}\right)$$

wherein $P_{ikl;t}^{EV}$ refers to the power which is provided by the operator i (here generator) for the electric vehicle 1 with the form of power generation k. Furthermore, all electric vehicles 1 are to be summed up, wherein the index j which belongs to the operator is dependent on l, or is determined by l.

The target function Z is provided or determined by means of the sum $Z = \Sigma_{n=1}^{7} Z_n$. Furthermore, a plurality of secondary conditions can be provided for the optimization method. For example $$\sum_t \sum_{i,k} \left(P_{ijk;t} + \sum_l P^{EOUT}_{ijkl;t}\right) = P^D_{j,t}$$

is a secondary condition which ensures that the power requirement $P_{j,t}^D$ of the consumer j at the point in time t is met by all power transfers. This is adjusted if separable and/or temporally shiftable power and/or external power is present. Further secondary conditions are provided, in particular positive lists and/or negative lists of generators and/or consumers.

In some embodiments, the power supply system can be connected to a further superordinate external power supply system (central market or wholesale trade), the power transfers (external power or external power transfers) which are thus supplied and discharged then having to be taken into account in the target function. This can also be carried out by means of a linear combination and/or secondary conditions.

By way of example, FIG. 2 shows a user interface which is designed as a graphical user interface or graphical user surface. In this case, a distinction is made between power supply units which have a renewable form of power generation and power supply units which have a non-renewable form of power generation. For this purpose, a first table 10 is represented which corresponds to the power supply units which have a renewable form of power generation, and a second table 11 is represented which corresponds to the power supply units which have a non-renewable form of power generation.

By way of example, the first table 10 has three rows 20, 21, 22 and three columns 40, 41, 42. The first row 20 is associated with a power supply unit which is designed as a photovoltaic plant. The second row 21 is associated with a power supply unit which is designed as a wind power plant. The third row 22 is associated with a power supply unit which is designed as a hydroelectric power plant.

The first column 40 of the first table 10 indicates the form of power generation of each power supply unit. The second column 41 of the first table 10 indicates a respective price, for example euros per kilowatt hour. The third column 42 of the first table 10 corresponds to the weighting of the power supply units and here also to the weighting of the forms of power generation. In the present exemplary embodiment, the weighting of the power supply units is equivalent to the weighting of the forms of power generation.

For inputting the weighting of the power supply units or the forms of power generation, the user interface has a slide control for each of the power supply units or forms of power generation, the value of which slide control can be varied between zero and one in one quarter increments. The weighting is therefore provided as a value between zero and one, wherein it is not necessary for the sum of the values of the weightings to equal the value of one. A comparatively high value of the weighting corresponds to a preference for the associated power supply unit. A comparatively low value of the weighting corresponds to the associated power supply unit not being favored with respect to the power transfer. The slide controls can be controlled by a user, for example by means of a computer mouse or by means of a touch-sensitive screen (touchscreen) or by means of a gesture control, shifted and fixed in the range between zero and one in one quarter increments. User input is also provided by means of a mobile phone (smartphone) or by means of a tablet computer.

Corresponding to the first table 10, the second table 11 of non-renewable power supply units or forms of power generation also has three rows 30, 31, 32, wherein the first row 30 is associated with a nuclear power plant, the second row 31 with a gas power plant and the third row 32 with a combined heat and power plant. The second table 11 also has three columns 40, 41, 42, wherein the first column 40 corresponds to the form of power generation, the second column 41 to a price, for example euros per kilowatt hour, and the third column 42 to the weighting of the power supply units.

The example represented highlights that renewable forms of power generation are given a stronger weighting (with 0.75) than non-renewable forms of power generation, such that the operator of the power consumption unit gives preference to renewable forms of power generation compared to non-renewable forms of power generation. The weighting is taken into account as a parameter of the target function when minimizing the target function. In other words, the weighting is incorporated into the target function. Figuratively, the optimization method is therefore automatically looking for a best possible power transfer which has the highest possible proportion of renewable forms of power generation. In this case, a highest possible proportion means that it must be ensured at all times that the power requirement is met by all power supply units collectively. For example, this does not necessarily mean that the power consumption unit obtains 75 percent of its electrical energy from the renewable power supply units. The weighting only ensures that as high a proportion as possible of the total power requirement of the power consumption unit is met by renewable forms of power generation and the power supply units associated therewith. This is a basic concept of the present invention, which makes it possible to take preferences into account without this resulting in power failure.

A power transfer can correspond to a commercial transaction, such as for energy markets or power exchanges. In this case, the methods taught herein significantly increase the likelihood of a transaction, such that regulation of power transfers is improved. In other words, a method as taught herein or one of its configurations can be used for operating an energy market or for operating a power exchange. This results in the best possible operation, taking into account weightings which characterize personal preferences of the operators of the power consumption units and/or the power supply units, for example.

Although the teachings of the present disclosure are illustrated and described in greater detail by the exemplary embodiments, the scope of the disclosure is not limited by the disclosed examples, or other variations can be derived therefrom by the person skilled in the art, without departing from the scope of protection of the disclosure.

What is claimed is:

1. A method for regulating an electrical power transfer from two power supply units to a power consumption unit, the method comprising:
providing a first data set with information regarding a minimum and maximum electrical power supply rate for each of the two power supply units;
providing a second data set with information regarding a power requirement of the power consumption unit, and a non-zero maximum period of time for which the power requirement may be temporally shifted for convenience of the two power supply units, and a weighting of each of the power supply units, wherein the weighting depends on a respective form of power generation and/or location;
providing a target function for an optimization method, wherein the target function includes the first data set, the second data set, and the weightings of the power supply units as parameters;
wherein the target function calculates a price for the power supplied by each of the two power supply units and/or a carbon dioxide emission rate for each of the two power supply units;
analyzing the target function to identify a local maximum or a local minimum as an extreme value complying with the non-zero maximum period of time; and
regulating the power transfer from each of the two power supply units to the power consumption unit to achieve the extreme of the target function.

2. The method as claimed in claim 1, further comprising using meeting the power requirement of the power consumption unit with the power supply rates of the two power supply units as a secondary condition of the target function.

3. The method as claimed in claim 1, wherein each the power supply unit is weighted according to a respective form of power generation and/or a respective geographical location.

4. The method as claimed in claim 1, wherein each power supply unit is weighted according to a respective operator.

5. The method as claimed in claim 1, wherein the second data set includes information regarding separable and/or temporally shiftable electrical power.

6. The method as claimed in claim 1, wherein:
there are at least two power consumption units;
a first data set for each of the at least two power consumption units includes a weighting of the respective consumption unit; and
the target function includes the weighting of the consumption units as a parameter.

7. The method as claimed in claim 6, wherein each power consumption unit is weighted according to a respective form of power consumption and/or according to a respective location.

8. The method as claimed in claim 6, wherein each power consumption unit is weighted according to a respective operator.

9. The method as claimed in claim 1, further comprising accepting the weightings of each power supply unit from a user input.

10. The method as claimed in claim 1, wherein:
the power supply unit comprises an energy storage device;
the first data set includes at least one datum selected from the group consisting of: availability of electrical energy stored within the energy storage device, a minimum capacity of the energy storage device, a maximum capacity of the energy storage device, a charging efficiency of the energy storage device, and a loss rate of the energy storage device.

11. The method as claimed in claim 10, wherein:
the energy storage device is associated with an electric vehicle;
the first data set includes at least one of: availability of the electric vehicle, and/or a minimum energy requirement for operating the electric vehicle.

12. A regulating device for regulating an electrical power transfer from two power supply units to a power consumption unit, the regulating device comprising:
a processor and a memory storing a set of instructions, the instructions, when loaded and executed by the processor, causing the processor to:
provide a first data set with information regarding a minimum and maximum electrical power supply rate for each of the two power supply units;
provide a second data set with information regarding a power requirement of the power consumption unit, and a non-zero maximum period of time for which the power requirement may be temporally shifted for convenience of the two power supply units, and a weighting of each of the power supply units, wherein the weighting depends on a respective form of power generation and/or location;
provide a target function for an optimization method, wherein the target function includes the first data set, the second data set, and the weightings of the power supply units as parameters;
wherein the target function calculates a price for the power supplied by each of the two power supply units and/or a carbon dioxide emission rate for each of the two power supply units;
analyze the target function to identify a local maximum or a local minimum as an extreme value complying with the maximum period of time; and
regulate the power transfer from each of the two power supply units to the power consumption unit to achieve the extreme value of the target function.

13. A power supply system comprising:
two power supply units;
a power consumption unit; and
a regulating device comprising a processor and a memory storing a set of instructions, the instructions, when loaded and executed by the processor, causing the processor to:
provide a first data set with information regarding a minimum and maximum electrical power supply rate for each of the two power supply units;
provide a second data set with information regarding a power requirement of the power consumption unit, a non-zero maximum period of time for which the power requirement may be temporally shifted for convenience of the two power supply units, and a weighting of each of the power supply units, wherein the weighting depends on a respective form of power generation and/or location;
provide a target function for an optimization method, wherein the target function includes the first data set, the second data set, and the weightings of the power supply units as parameters;

wherein the target function calculates a price for the power supplied by each of the two power supply units and/or a carbon dioxide emission rate for each of the two power supply units;

analyze the target function to identify a local maximum or a local minimum as an extreme value complying with the maximum period of time; and regulate a power transfer from each of the two power supply units to the power consumption unit to achieve the extreme value of the target function;

two first data connections for exchanging the first data sets between the respective two power supply units and the regulating device;

a second data connection for exchanging the second data set between the power consumption unit and the regulating device; and a respective power transfer line running from each of the power supply units to the power consumption unit for electrical power transfer.

14. The power supply system as claimed in claim 13, wherein each of the power supply units comprises a measuring device recording information from the first data set of the respective power supply unit and/or the power consumption unit comprises a measuring device for recording information from the second data set.

15. The power supply system as claimed in either of claim 13, wherein the power consumption unit comprises a user interface for entering weighting of the power supply units.

* * * * *